July 13, 1943.   D. S. GUSTIN ET AL   2,324,385
METHOD AND MACHINE FOR MAKING MOLDED STEMS FOR ELECTRICAL DEVICES
Filed Dec. 1, 1938   3 Sheets-Sheet 1
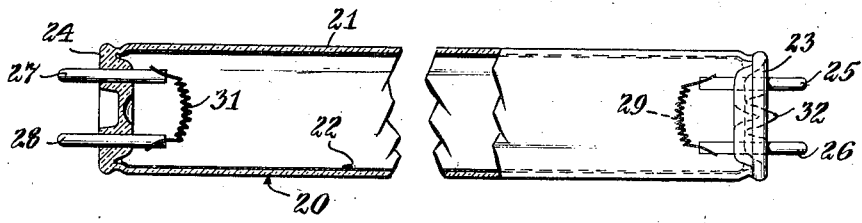
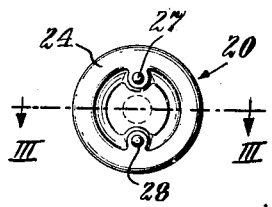
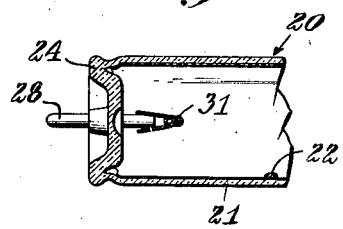
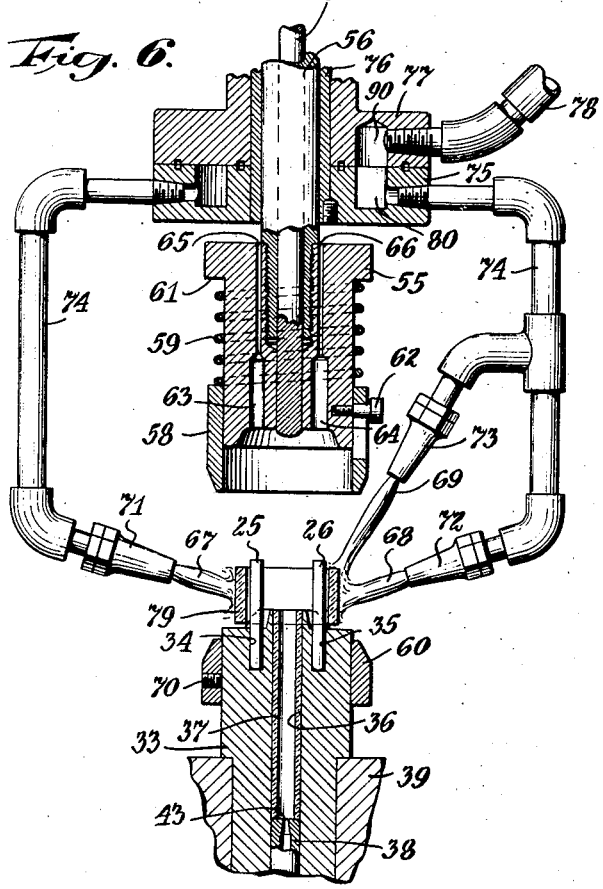
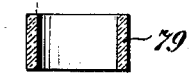
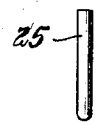
INVENTOR
D. S. GUSTIN.
H. K. RICHARDSON.
BY
ATTORNEY July 13, 1943.　　D. S. GUSTIN ET AL　　2,324,385
METHOD AND MACHINE FOR MAKING MOLDED STEMS FOR ELECTRICAL DEVICES
Filed Dec. 1, 1938　　3 Sheets-Sheet 2

INVENTOR
D. S. GUSTIN
H. K. RICHARDSON
BY
ATTORNEY

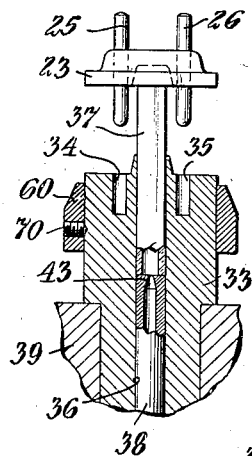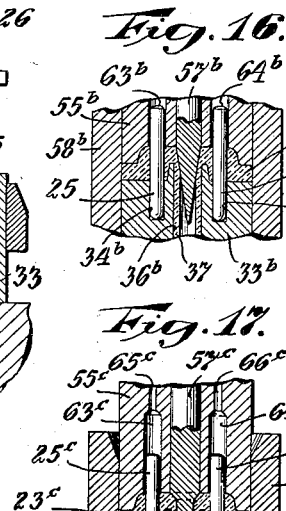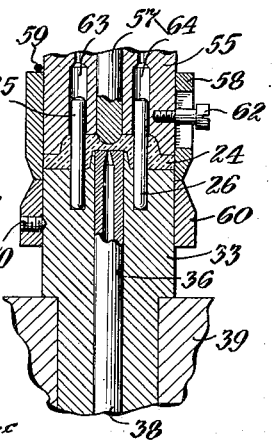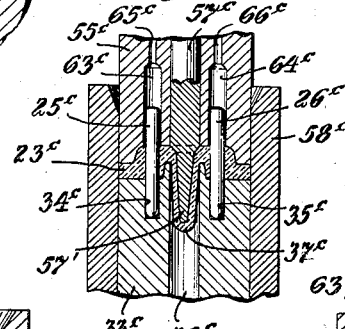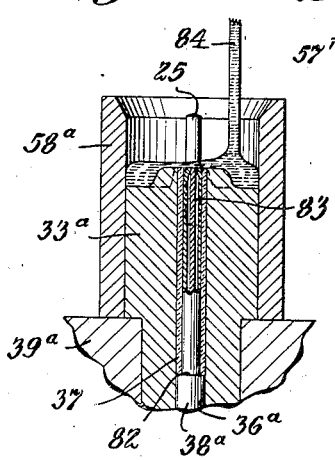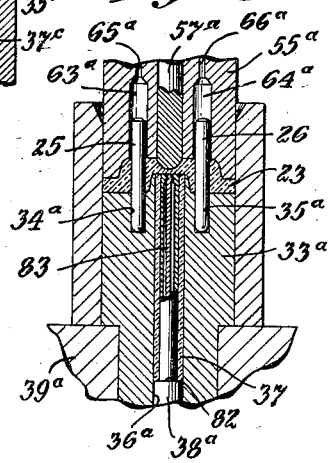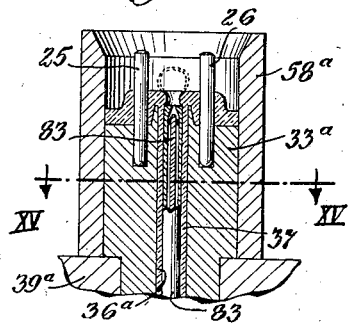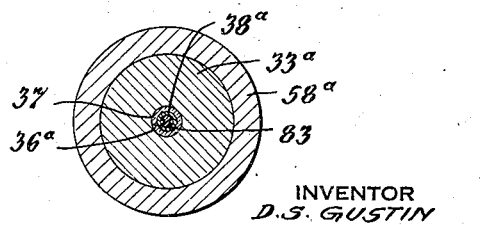

Patented July 13, 1943

2,324,385

UNITED STATES PATENT OFFICE 2,324,385

METHOD AND MACHINE FOR MAKING MOLDED STEMS FOR ELECTRICAL DEVICES

Daniel S. Gustin and Henry K. Richardson, Bloomfield, N. J., assignors to Westinghouse Electric & Manufacturing Company, East Pittsburgh, Pa., a corporation of Pennsylvania Application December 1, 1938, Serial No. 243,356

8 Claims. (Cl. 49—66)

This invention relates to the manufacture of electrical devices, and more particularly to the molding of the flares, cups or base portions thereof.

The principal object of our invention, generally considered, is the manufacture of electrical devices such as discharge lamps, in which the lead-in conductors are made rigid enough to serve as outer contacts or posts in order to dispense with basing, the flares or cups being formed of glass molded therearound to form stems, either by softening and pressing glass blanks, or by pouring molten glass around the leads while held in place.

Another object of our invention is the manufacture of electric lamps, especially of the discharge type, in which the outer electrode leads are made so rigid that they are adapted to engage the sockets directly without basing, said leads being consolidated directly with glass cups or flares, electrodes mounted on the inner ends thereof, and the molded glass then sealed to the bulb proper.

A further object of our invention is the provision of a machine for holding rigid electrode leads and molding glass therearound, whereby the bulb proper may then be directly sealed thereto, with an elimination of the usual base.

Other objects and advantages of our invention, relating to the construction and arrangement of the various parts, will become apparent as the description proceeds.

Referring to the drawings:

Figure 1 is a fragmentary elevational view, partly in section, of an electrical discharge device embodying our invention.

Figure 2 is an end elevational view of the device of Figure 1.

Figure 3 is a fragmentary sectional view on the line III—III of Figure 2, in the direction of the arrows.

Figure 4 is an axial sectional view of one of the blanks used for making the glass base or flare which holds the heavy leads of a discharge or other electrical device, such as shown in Figure 1.

Figure 5 is an elevational view of one of the heavy leads used in making a base for a discharge or other electrical device, such as shown in Figure 1.

Figure 6 is a fragmentary vertical sectional view, with parts in elevation, showing one embodiment of a machine for manufacturing glass cups or bases for devices such as shown in Figure 1.

Figure 10 is a view corresponding to Figure 9, but showing a subsequent position where the glass cup or base has been ejected from the machine by upward pressure on the lower end of the exhaust tube portion thereof.

Figure 11 is a view corresponding to Figure 8, but illustrating the position of the machine parts when a glass cup or base portion, without exhaust tube, is being formed.

Figure 12 is a view corresponding to Figure 6 but showing fragmentary portions of a machine, modified for forming glass cups or bases from molten glass.

Figure 13 is a view corresponding to Figure 12, but showing a subsequent position where the upper mold element has been brought down to press the molten or soft glass into the desired shape, for making a glass cup or base portion for a device such as shown in Figure 1.

Figure 14 is a view corresponding to Figure 13, but showing a subsequent position where the upper mold element has been withdrawn and air pressure admitted to blow a hole in the glass cup to open the upper end of the exhaust tube portion.

Figure 15 is a horizontal sectional view of the line XV—XV of Figure 14, in the direction of the arrows.

Figure 16 is a fragmentary vertical sectional view corresponding to Figure 11, but showing another modification.

Figure 17 is a fragmentary view corresponding to Figure 16, but showing a further modification.

Figure 7:
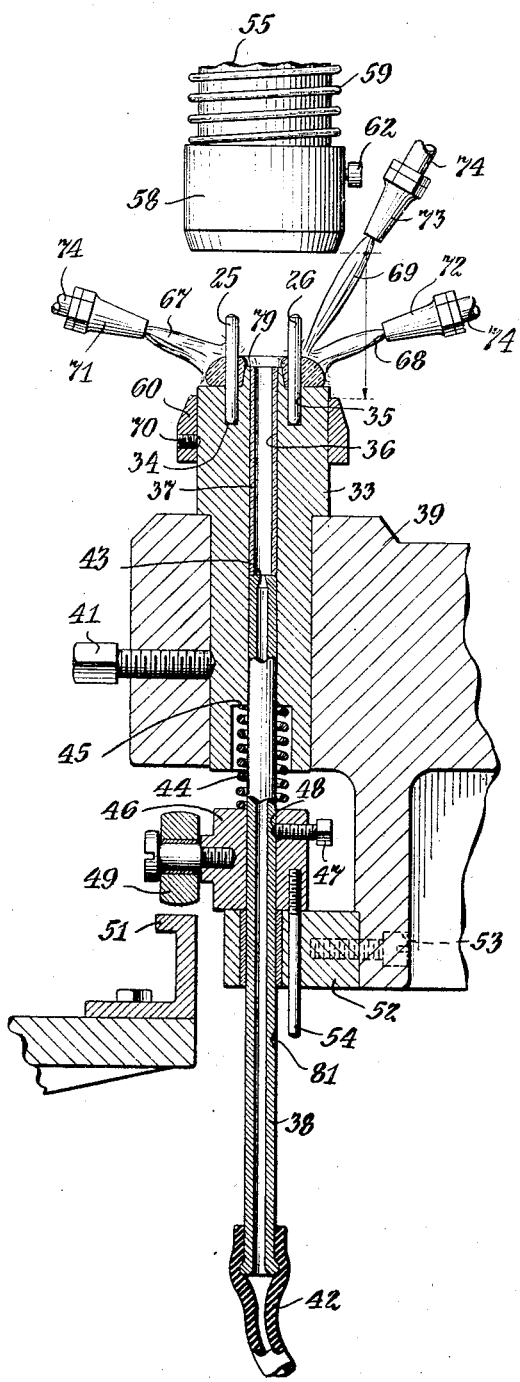
Figure 7 is a fragmentary view corresponding to Figure 6, but showing additional portions of the machine, below the parts shown in Figure 6, the glass blank being shown, in this figure, heated to such an extent that it has softened and flowed around the leads supported on the lower mold element.

Referring to the drawings in detail, like parts being designated by like reference characters, and first considering Figures 1 to 5 inclusive, there is shown, as one embodiment of our invention, an electrical device 20 of the discharge type, comprising an envelope or bulb 21 in the form of an elongated hollow cylinder containing some mercury 22, the ends of said enevelope being closed by glass cups or bases 23 and 24. The cup 23 has incorporated therewith lead-in conductors 25 and 26, while the cup 24 has incorporated therewith lead-in conductors 27 and 28, to form stems, the conductors 25 to 28, inclusive, being so rigid that they are adapted to serve as outer contact posts and eliminate the necessity for the usual basing.

The inner ends of the leads 25 and 26 carry a filament 29, serving as one electrode, and the inner ends of the conductors 27 and 28 carry a similar filament 31, serving as the other electrode. The filaments may be formed of tungsten or other suitable material, with or without oxide coating to render them more efficient for the emission of electrons. The ends of the filaments 29 and 31 are connected to their lead-in conductors in any suitable manner, as by means of spot welding.

The conductors 25 to 28, inclusive, are formed of suitable material, tungsten and nickel alloys being mentioned as examples, and the glass sealed therearound is made of such a composition that it will not crack upon cooling around the lead-in conductors. For example, if soft glass is used for the base, then nickel iron, chrome iron, dumet or other alloys of the proper coefficient of expansion are desirably employed as the lead-in conductors. If (Corning code) No. 172 (or hard aluminum borosilicate) or No. 704 or 705 (both soft borosilicate) glass is employed, the lead-in conductors are formed of beaded molybdenum. Or if No. 704 or 705 glass is employed, such conductors may consist of "Kovar" (which is a patented cobalt-nickel-iron alloy) as for application in sodium and mercury vapour lamps. If No. 775 or 705 (both soft borosilicate) glass, or "Nonex" or No. 772 (or lead borosilicate) glass is used, then beaded tungsten leads are desirably employed to match the expansion of said glass.

It will be noted that the cup or base 23 has an exhaust tip 32 while the cup or base 24 is without such a tip, as it is unnecessary to exhaust at more than one end. The tip 32 is protected by making the cup reentrant or concave outwardly, and the concave portion of both cups 23 and 24 may be finished by filling with a material like sealing wax, if desired. The machine to be now described, for making the cups, is employed a little differently in making the two different types.

Referring now to the embodiment of our invention, illustrated in Figures 6 to 10, inclusive, there are shown portions of one embodiment of a machine for forming such cups or bases as just described, and the manufacture of one, such as designated by the reference character 23, with an exhaust tube, will first be disclosed.

The machine, as shown in Figure 6, comprises a lower mold element 33 having pockets or cavities 34 and 35 in its upper face for receiving heavy lead-in conductors 25 and 26, such as those designated as forming parts of the cup or glass base 23. The lower mold element 33 also has a central aperture 36 receiving a glass exhaust tube 37, the lower end of which rests on the upper end of a tube 38, desirably formed of metal and adapted to carry compressed air to said exhaust tube, for a purpose to be subsequently explained. The lower mold element 33 may be held in position in a support 39 as shown in Figure 7, by means of a set screw 41. Air may be conducted to the lower end of the tube 38, by means of a rubber tube 42 from a suitable source of supply.

The air tube 38, desirably has the upper end of its passage constricted, as indicated at 43, so as to eliminate the possibility of glass flowing thereinto, when employed without an exhaust tube. It is normally held in the position shown in Figure 7 by means of a spring 44, acting between a shoulder 45 on the lower mold element 33 and a collar 46 secured to said air tube 38, as by means of a set screw 47, the inner end of which engages a notch or cavity 48 in said air tube, which cavity is so positioned that said tube is held with its upper end at the proper elevation for supporting a normal length of exhaust tube, so that its upper end extends to the top of the lower mold element 33, as shown in Figures 6 and 7.

In order to provide for raising the exhaust tube 37 to subsequently eject the formed cup or base 23 from the mold element 33, the collar 46 carries a cam roller 49, actuated by a cam 51 at the proper time to raise the air tube 38, and its supported exhaust tube, for ejecting or stripping the same and the cup molded thereto, from the machine. During this lifting operation, the air tube 38 is guided, not only in the lower mold element 33, but also in a guiding block 52, secured to the support 39 in any desired manner, as by means of a screw 53. In order to prevent turning of the air tube 38 and the cam wheel 49, carried thereby, the collar 46 desirably carries a guiding rod 54 depending therefrom, and slidable in the block 52.

Cooperating with the lower mold element 33, is an upper mold element 55, carried on and operated by a rod 56. Operable in the upper mold element 55 is a plunger 57, for a use to be subsequently pointed out. The upper mold element carries an annular supplemental mold portion 58, vertically slidable thereon and held in a normally lowered position, as illustrated in Figure 6, by means of coil spring 59, operating between its upper surface and a shoulder 61 on the upper mold element 55. Undesired depression of the supplemental mold member 58 is prevented by means of a stop 62, connected to the upper mold element 55, and received in a corresponding slot in the supplemental member 58. When the upper mold element 55 descends, the supplemental member telescopes with the lower mold element 33 and engages an annular member 60 connected thereto, as by means of set screw 70. The mold element 55 is provided with pockets or apertures 63 and 64 receiving the upper ends of the leads 25 and 26, said pockets desirably having their upper ends vented to the atmosphere to relieve any compression when the mold is closed, as by means of small apertures 65 and 66.

In order to heat the glass blank 79 and the upper end of the exhaust tube 37 during the process of forming the glass cup or base for the device of Figure 1, we provide suitable fires 67, 68 and 69, issuing from nozzles 71, 72 and 73, carried by piping 74, supplied with suitable combustible gas from manifold 75, carried by and rotatable with hollow shaft 76, driven by suitable means so that it rotates on the rod 56, and receiving a gaseous mixture through registering ports 80 and 90 from the hollow collar 77, held against rotation with the shaft 76, and receiving gas from pipe 78.

The manner of using the machine of Figures 6 to 10 inclusive, for making glass cups or bases, such as designated by the reference character 23 is desirably as follows:

The first step in the operation, is desirably to place an exhaust tube 37 in the lower mold element, where it rests on the upper end of the air tube 38, as shown in Figure 6. The lead-in conductors 25 and 26 are then placed in their pockets 34 and 35, in the lower mold element, as shown in the same figure. A section 79 of large diameter glass tubing, corresponding in volume with that of the cup to be formed, is then placed on the lower mold element 33 so that it encircles the upper end of the exhaust tube 37 and the lead-in conductors 25 and 26, as shown in Figure 6.

The fires 67, 68 and 69 are then rotated, by turning the hollow shaft 76 by any suitable means, not shown, until the glass of the section 79 softens and draws around the leads 25 and 26, as shown in Figure 7. The action of the softened glass in wetting the leads 25 and 26 and drawing in around the upper end of the exhaust tube 37, is facilitated by the direction of flow of the fires 67, 68 and 69, and the surface tension of the nearly molten glass.

Figure 8:
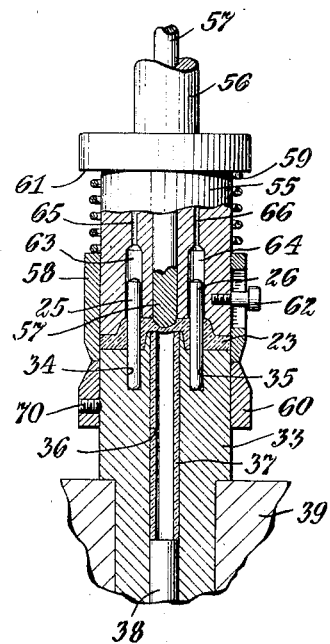
Figure 8 is a fragmentary view corresponding to Figure 7, but showing a subsequent position where the upper mold element has been brought down upon the softened glass to mold and consolidate it with the exhaust tube portion and associated leads.

When the glass becomes sufficiently soft, as represented in Figure 7, the upper mold element 55 is brought down to the position represented in Figure 8, as by a downward movement of its supporting rod 56, causing the supplemental mold member 58 to telescope with the lower mold element 33, engage the annular member 60, and the glass to be pressed into the desired shape between the upper and lower mold elements 55 and 33, as represented in Figure 8. The glass, at the same time, is pressed into consolidating engagement with the upper end of the exhaust tube 37, the glass above the exhaust tube opening being thinned by the downward movement of the plunger 57, which also insures a good seal with the exhaust tube.

Figure 9:
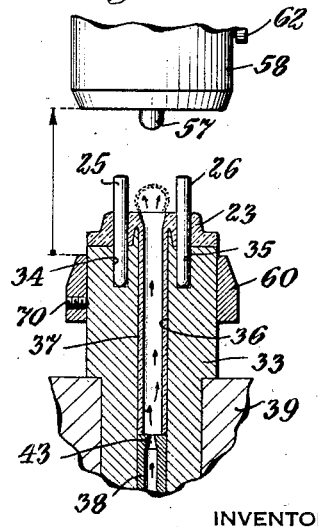
Figure 9 is a fragmentary view corresponding to Figure 8, but showing a subsequent position in which the upper mold element has been raised, while the upper end of the exhaust tube is opened by the application of air pressure to blow out the thin wall portion of the glass cup thereabove.

The next step in the process, is to raise the upper mold element 55, slightly, while leaving the plunger 57 in engagement with the formed cup or base 23, whereby said base is detached from the upper mold element and remains resting on the lower mold element 33, both upper mold element 55 and plunger 57 are then raised out of the way, as shown in Figure 9. The diaphragm or thin section of glass closing the upper end of the exhaust tube 37, as shown in Figure 8, is now broken before the glass has had a chance to harden, by compressed air directed upwardly through the exhaust tube, as shown in Figure 9.

The completed base or cup 23, with the exhaust tube 37 sealed thereto, is then ejected or stripped from the lower mold element 33, by an upward movement of the air tube 38, as by means of the cam 51 acting on the roller 49 secured thereto, whereupon, an operator may remove the formed base or cup completely from the machine, preparatory to making another one.

It will, of course, be understood that in order to make the base or cup forming operation continuous, we desirably have a series of mold elements and associated parts, such as shown in the figures, and cause the same to move along to first receive the elements 37, 25, 25 and 79, heat and compress them to consolidate and form the base or cup, and then raise them for removal, as shown in Figure 10.

Referring now to the embodiment of our invention illustrated in Figure 11, there is fragmentarily shown the position of the machine corresponding with Figure 8, except that the base 24 being manufactured is one of the type without an exhaust tip and so, during the forming operation, the air pipe 38 is raised so that its upper end is at a level corresponding with that of the top of the exhaust tube 37 in Figure 7, where the set screw 47 holds it in place, as by engaging the lower notch or cavity 81, rather than the upper notch or cavity 48, as in the preceding instance. The restricted upper end 43 of the air passage through the pipe 38 prevents the glass from being pushed into the air tube 38 by the plunger 57. In the present instance, of course, the diaphragm or thinned section of glass formed by the plunger 57, is left intact, rather than being opened by a blast of air directed through the air tube 38. Otherwise the manner of forming the cup or base 24, is identical with that of forming the cup or base 23.

Referring now to the embodiment of our invention, illustrated in Figures 12 to 15, inclusive, there is shown apparatus modified so as to receive molten glass rather than an annular glass blank, such as represented by the reference character 79 in connection with the preceding embodiment. In this instance the fires and apparatus for supplying gas are eliminated, but in the main, the other parts of the apparatus may be substantially the same as in connection with the preceding embodiment, except that the lower mold element $33^a$, instead of the upper mold element $55^a$, has a supplemental annular mold member $58^a$ disposed in telescoping relation therewith, and said upper mold element, upon descent, telescopes with said member $58^a$.

As in the preceding embodiment, the lower mold element $33^a$ rests on a support $39^a$ and is provided with a central aperture $36^a$ which receives an exhaust tube 37 supported on a shoulder 82 provided on an air pipe $38^a$. The upper end of the air pipe is restricted in diameter so as to fit the exhaust tube 37 and carries an air-control valve 83, reciprocating therein, so as to either allow air to pass up into the exhaust tube to open the upper end thereof by blowing out a diaphragm of glass, as in connection with the first embodiment, or closing said passageway to prevent glass from flowing into the aperture when the same is being poured.

As in the first embodiment, the upper mold element $55^a$ has its lower surface contoured to correspond with the surface desired on the cup or base 23 being formed, and carries a plunger $57^a$ used for the same purpose as the plunger 57 of the first embodiment. The lower mold element $33^a$ is also pocketed as indicated at $34^a$ and $35^a$ to receive the leads 25 and 26, and the upper mold element has corresponding lead-receiving pockets $63^a$—$64^a$, vented as indicated at $65^a$ and $66^a$ for a similar purpose.

The only difference between forming a cup 23 carrying an exhaust tube 37, and one without such a tube, is that if the exhaust tube 37 is omitted the aperture $36^a$ is closed in any desired manner, as by using an imperforate lower mold element or die otherwise like that designated $33^a$, or by closing the central aperture $36^a$ therethrough, as by means of an air pipe otherwise like that designated $38^a$, but completely filling the aperture $36^a$ and having its upper end closed by a valve or other means.

In order to make the formation of bases or glass cups continuous, we desirably have a series of molds $33^a$—$55^a$, such as shown in Figures 12 to 15, inclusive, and cause the lower mold elements 33ª—58ª to move under a stream of glass, one by one, to receive the charge required and then pass on to make way for the next mold element.

After first placing the leads 25 and 26 in the lower mold element 33ª, as shown in Figure 12, and with or without the exhaust tube 37 in position, depending upon whether a cup of the type of 23 or that of the type of 24 is to be made, the mold element 33ª, under consideration, is kept under the molten glass stream 84 until the glass has risen to the proper level, or the volume of glass corresponding with that of the cup to be formed, has been placed in the mold elements 33ª—58ª as indicated, for example, in Figure 12.

In order to accurately predetermine the amount of glass fed to the lower die or mold element 33ª, we preferably cause the molten glass stream 84 to issue from a glass melting furnace, not shown, through an orifice provided with a die, preferably formed of an alloy of platinum and rhodium, such as described in Patent No. 2,031,083, dated February 18, 1936, or equivalent material.

The temperature of the stream is desirably maintained uniform by sighting a radiation pyrometer, not shown, thereon, and controlling the heat of the furnace by means of apparatus such as described and claimed in Patent No. 2,116,450, dated May 3, 1938, so that an accurately controlled amount of glass, just sufficient to fill the mold to the desired extent, is fed thereto, as it passes under the stream 84.

When the mold has been charged with the desired volume of glass and has surrounded and wet intermediate portions of the leads 25 and 26, wetting and consolidating with the upper end of the exhaust tube 37, if used, it is cut off by moving the mold from thereunder, or in any desired manner, and the upper mold element 55ª is then brought down into engagement with the glass to form the same, the central plunger 57ª being depressed to thin the central portion of the formed cup, especially if it is one with an exhaust tube.

The next step is to raise the upper mold element 55ª slightly, while leaving the plunger 57ª in engagement with the formed cup or base 23 or 24, as the case may be, whereby said base is detached from the upper mold element and remains resting on the lower mold element 33ª. Both the upper mold element 55ª and the plunger 57ª are then raised out of the way to leave the upper surface of the molded cup free, as shown in Figure 14. The diaphragm or thinned section of glass, closing the upper end of the exhaust tube 37 as a cup 23 is being formed, is now broken, before the glass has hardened, by compressed air directed upwardly through the exhaust tube, as shown in Figure 14. If a cup 24 is being formed, it is, of course, unnecessary to perform this exhaust tube opening operation.

The completed base or cup 23 or 24, as the case may be, is then ejected or stripped from the lower mold element 33ª and forced out of the surrounding annular element 58ª by an upward movement of the air tube 38ª, as by means of a cam designated by the reference character 51 in Figure 7 acting on a roller like that designated by the reference character 49 in the same figure, secured thereto, whereupon an operator may remove the formed cup completely from the machine preparatory to making another one.

Referring now to the embodiment of our invention illustrated in Figure 16, there are shown fragmentary portions of apparatus corresponding with that of Figures 12 to 15, inclusive, except that here provision is made for only making cups provided with exhaust tubes. The main distinction between the machine of Figure 16 and that of Figures 11 to 15, inclusive, is that after molding glass and consolidating it with an exhaust tube, it is not necessary to blow out the upper or inner end of the exhaust tube, as provision is made for keeping the upper end thereof open during the process of molding.

As in the embodiment of Figures 11 to 15 inclusive, there are provided a lower mold element 33ᵇ and a supplemental annular mold member 58ᵇ, supported as heretofore. The mold member 33ᵇ is formed with a simple aperture 36ᵇ which receives an exhaust tube 37 supported in any desired manner, as on an ejector or stripper member, a ledge or a shoulder, not shown. No necessity arises in the present instance of having an air pipe corresponding with that designated as 38ª in the preceding embodiment, as the upper end of the exhaust tube 37 is kept open by the lower, preferably tapered, end of a plunger 57ᵇ, moved to the position illustrated in Figure 16 before the upper mold 55ᵇ moves downwardly to its illustrated position.

As in the preceding embodiment, the upper mold element 55ᵇ has its lower surface contoured to correspond with the upper surface desired on the cup or base 23 to be formed, and the plunger 57ᵇ moves axially thereof and is used for a purpose corresponding with that of the plunger 57 except, as previously mentioned, it also dispenses with the necessity of blowing out the upper end of the exhaust tube by air. The lower mold element 33ᵇ is pocketed as indicated at 34ᵇ and 35ᵇ to receive the leads 25 and 26, and the upper mold element has corresponding lead-receiving pockets 63ᵇ and 64ᵇ, desirably vented as in the preceding embodiment.

The operation of apparatus in accordance with Figure 16 is almost identical with that of the apparatus of Figures 11 to 15, inclusive. After first placing the leads 25 and 26 in the lower mold element 33ᵇ as shown in Figure 16, and placing the exhaust tube 37 in the position illustrated, the lower mold element is kept under a stream of molten glass, as in the preceding embodiment, until glass has risen to the proper level, or the volume of glass corresponding with that of the cup to be formed, has been placed in the mold elements 33ᵇ—58ᵇ, as shown in Figure 12 in connection with the preceding embodiment.

As in said preceding embodiment, the amount of glass is desirably accurately predetermined by using a die formed of a material such as an alloy of platinum and rhodium, as described in Patent No. 2,031,083, previously referred to, the temperature of the stream being desirably maintained by using control apparatus as described and claimed in Patent No. 2,116,450, also previously referred to.

When the mold has been charged with the desired volume of glass which has surrounded and wet intermediate portions of the leads 25 and 26 and consolidated with the upper end of the exhaust tube 37, the stream of glass is cut off, as by moving the mold from thereunder or in any desired manner, the central plunger 57ᵇ depressed to the position shown in Figure 16 to either push the glass from the upper end of the exhaust tube 37 or prevent the same from closing thereover, and the upper mold element 55ᵇ then brought down into engagement with the top surface of the glass to form the same, as in the preceding embodiment.

The next step is to raise the upper mold element 55$^b$ slightly, while leaving the plunger 57$^b$ in engagement with the formed cup or base 23, whereby said base is detached from the upper mold element and remains resting on the lower mold element. Both the upper mold element 55$^b$ and the plunger 57$^b$ are then moved out of the way to leave the upper surface of the molded cup free, as shown, for example, in connection with the preceding embodiment in Figure 14, except that in the present instance, there is no further step performed besides removing the formed base from the lower mold element 33$^b$. Such removal may be accomplished either by pulling up on the leads 25 and/or 26, or by pushing up on the exhaust tube 37. Although the use of an exhaust tube opening prong has been shown only in connection with the use of molten glass supplied in a stream, it will be understood that it may also be used in connection with apparatus as disclosed in Figures 1 to 10, inclusive.

Referring now to the embodiment of our invention illustrated in Figure 17, there are shown fragmentary portions of apparatus corresponding with that of Figure 16, except that the use of an initially separate exhaust tube 37 is obviated.

As in the embodiment of Figure 17, we have a lower mold element 33$^c$ and a supplemental annular mold member 58$^c$, desirably supported as heretofore. The mold member 33$^c$ is formed with an aperture 36$^c$ in which the exhaust tube is formed from molten glass, as will presently be described.

The upper mold element 55$^c$ has its lower surface contoured to correspond with the upper surface desired on the cup or base 23$^c$ to be formed. The plunger 57$^c$ moves axially thereof and has a reduced extension 57′ fitting in the aperture 36$^c$, with clearance corresponding with the desired thickness of the exhaust tube portion 37$^c$ to be formed on the base 23$^c$. The lower mold element 33$^c$ is pocketed, as indicated at 34$^c$ and 35$^c$, to receive the leads 25$^c$ and 26$^c$, and the upper mold element 55$^c$ has corresponding lead-receiving pockets 63$^c$ and 64$^c$, desirably vented as indicated at 65$^c$ and 66$^c$.

The operation of apparatus in accordance with Figure 17 is almost identical with that of the apparatus of Figure 16. After first placing the leads 25$^c$ and 26$^c$ in the lower mold element 33$^c$, said mold element is kept under a stream of molten glass, as in the preceding embodiment, until glass has risen to the proper level, or a volume of glass corresponding with that of the cup and integral tapered exhaust tube portion to be formed has been placed in the mold elements 33$^c$—58$^c$, as shown in Figure 12 in connection with a preceding embodiment.

As in the preceding embodiments, the amount of glass is desirably accurately predetermined by using a die formed of a material such as an alloy of platinum and rhodium, as described in Patent No. 2,031,083 previously referred to, the temperature of the stream being desirably maintained by using control apparatus as described in Patent No. 2,116,450, also previously referred to.

When the mold has been charged with the desired volume of glass, which has surrounded and wet intermediate portions of the leads 25$^c$ and 26$^c$, and has just started to overflow into the aperture 36$^c$, the stream of glass is cut off, as by moving the lower mold element from thereunder, or in any desired manner, and the central plunger 57$^c$ and upper mold element 55$^c$ start to descend to finally reach the position illustrated in Figure 17. The movement of these elements is preferably not at the same rate of speed, the upper mold element 55$^c$ desirably first reaching the position illustrated, where it causes the level of the glass in the mold elements 33$^c$—58$^c$ to rise, thereby providing sufficient glass to be acted on immediately by the descending plunger 57$^c$, and particularly the reduced extension 57′ thereof, to form the exhaust tube portion 37$^c$ as illustrated.

The next step is to raise the upper mold element 55$^c$ slightly, while leaving the plunger 57$^c$ in engagement with the formed cup or base 23$^c$, whereby said base is detached from the upper mold element and remains resting on the lower mold element. Both the upper mold element 55$^c$ and the plunger 57$^c$ are then moved out of the way to leave the upper surface of the molded cup free, as shown, for example, in connection with a preceding embodiment in Figure 14, except that in the present instance there is no further step necessary besides removing the formed cup or base 23$^c$. Such removal may be accomplished either by pulling up on the leads 25$^c$ and/or 26$^c$, or by pushing up on the exhaust tube 37$^c$.

From the foregoing disclosure, it will be seen that we have devised a novel form of glass stem, base, or cup, particularly adapted for discharge devices, although suitable for other electrical devices, and improved forms of apparatus, especially adapted for molding such cups or other similar devices, either from softened glass blanks or directly from molten glass, thereby avoiding some subsequent steps usually performed. The cups, as formed have incorporated therewith, rigid prongs having the double function of lead-in conductors and outer contact members, thereby enabling us to dispense with a subsequent basing operation.

Although preferred embodiments of our invention have been disclosed, it will be understood that modifications may be made within the spirit and scope of the appended claims.

We claim:

1. A machine for making stems for electrical devices, comprising a lower mold element with cavities for receiving the lower portions of rigid lead-in conductors, an upper mold element having downwardly opening cavities for receiving the upper portions of said conductors, and a plunger operating in said upper mold element, in order to provide for stripping the formed stems therefrom 2. A machine for making stems for electrical devices, comprising a lower mold element having a central aperture for receiving an exhaust tube and an air tube therebelow for furnishing air pressure to said exhaust tube and serving as a stop therefor, said lower mold element also having pockets for receiving the lower portions of rigid lead-in conductors, an upper mold element having downwardly opening pockets for receiving the upper portions of said lead-in conductors, and a plunger working therein for thinning a section of the formed stem in order that it may be opened for connection with an exhaust tube, said plunger also serving as stripping means for preventing the formed stem from sticking to the upper mold element.

3. A machine for making stems for electrical devices, comprising a lower mold element with cavities for receiving the lower portions of rigid lead-in conductors, an upper mold element having downwardly opening cavities for receiving the upper portions of said conductors, and a plunger operating in said upper mold element, in order to provide for keeping open the upper end of an exhaust tube portion and strip formed stems from the machine.

4. A machine for making stems for electrical devices, comprising a lower mold element with cavities for receiving the lower portions of rigid lead-in conductors and an aperture for receiving an exhaust tube, a plunger reciprocable in said aperture for moving an exhaust tube when positioned therein, an upper mold element having downwardly opening cavities for receiving the upper portions of said conductors, and a plunger operating in said upper mold element for stripping stems therefrom when formed.

5. A machine for making stems for electrical devices, comprising a lower mold element with cavities for receiving the lower portions of rigid lead-in conductors and an aperture for receiving an exhaust tube, a plunger reciprocable in said aperture for moving an exhaust tube when positioned therein, said plunger being hollow for supplying compressed air to said tube for making an exhaust aperture in a stem being constructed, an upper mold element having downwardly opening cavities for receiving the upper portions of said conductors, and a plunger operating in said upper mold element for stripping stems therefrom when formed.

6. A machine for making stems for electrical devices comprising a lower mold element with cavities for receiving the lower portions of lead-in conductors, an upper mold element having downwardly opening cavities for receiving the upper portions of said conductors, a plunger operating in said upper mold element to provide for stripping formed stems therefrom, and another plunger operating in the lower mold element to raise formed stems therefrom.

7. The method of making a stem for an electrical device comprising positioning the lower portions of lead-in conductors in a lower mold element, depositing a desired quantity of softened glass around said conductors, forming said glass by the descent of an upper mold element pocketed to receive the upper portions of said conductors, causing relative movement between said upper mold element and a plunger operating therein to strip formed stems from said upper mold element, and raising the formed stems from said lower mold element by a plunger operating in the latter.

8. The method of making a stem for an electrical device, comprising positioning lead-in conductors in a lower mold element, depositing a desired quantity of softened glass around said conductors, forming said glass by the descent of an upper mold element, depressing a plunger, operating in said upper mold element, to thin a central portion of said glass, raising said upper mold element to cause the formed stem to be stripped therefrom by said plunger, raising said plunger, and ejecting the formed stem from said lower mold element by another plunger operating therein.

DANIEL S. GUSTIN.
HENRY K. RICHARDSON.